(12) United States Patent
Wheat

(10) Patent No.: US 6,216,878 B1
(45) Date of Patent: Apr. 17, 2001

(54) SYSTEM FOR RECYCLING POST-INDUSTRIAL-USE PLASTIC

(76) Inventor: Terry W. Wheat, 2525 Woburn Dr., High Ridge, MO (US) 63049

(*) Notice: Subject to any disclaimer, the term of this patent is extended or adjusted under 35 U.S.C. 154(b) by 0 days.

(21) Appl. No.: 09/459,040

(22) Filed: Dec. 10, 1999

(51) Int. Cl.[7] .............................. B07C 5/00; B07C 9/00
(52) U.S. Cl. ..................... 209/509; 209/44.1; 209/522; 209/546; 209/702
(58) Field of Search .................... 209/44.1, 209, 209/522, 546, 702, 509

(56) References Cited

U.S. PATENT DOCUMENTS 5,259,513 * 11/1993 Tahkanen et al. ............... 209/566
5,885,002 * 3/1999 Reiss ............................... 383/37

* cited by examiner

*Primary Examiner*—Donald P. Walsh
*Assistant Examiner*—Mark J. Beauchaine
(74) *Attorney, Agent, or Firm*—Grace J. Fishel

(57) ABSTRACT

A system for recycling post-industrial-use plastic waste based on coloring an object, which will become post-industrial-use plastic waste, a user-specified color, said color correlated with a system for identifying plastic based on the resin content of the object. Said object, in the user-specified color, provided to the end user to protect a part shipped by a parts manufacturer, with sorting of the objects into homogenous resin groups being done by the end user based on color.

12 Claims, 3 Drawing Sheets

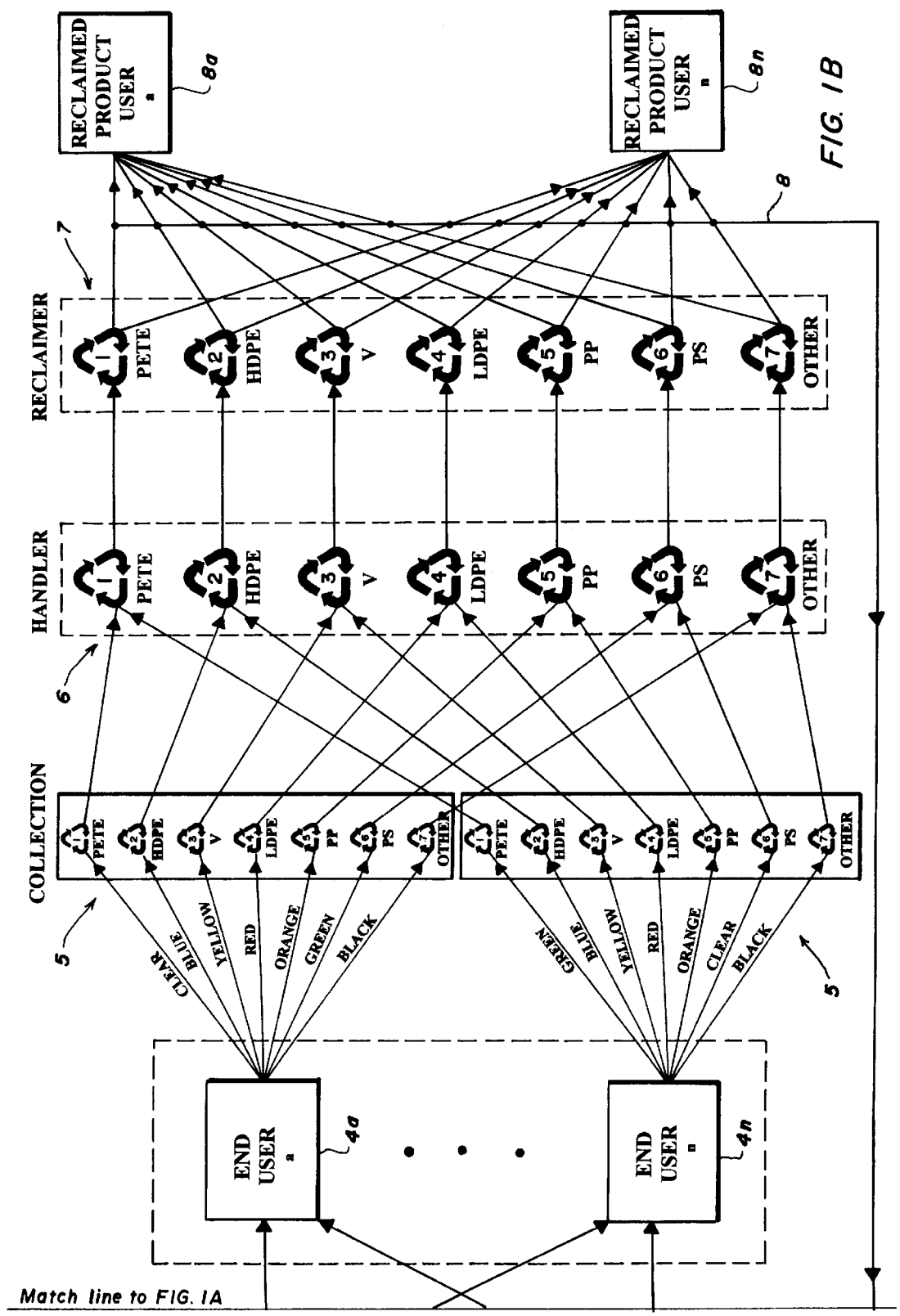

SYSTEM FOR RECYCLING POST-INDUSTRIAL-USE PLASTIC

BACKGROUND OF THE INVENTION

1. Field of the Invention

The present invention relates to a processing system for recycling post-industrial-use plastic, i.e., a processing system for converting discarded manufacturing plastic waste into a resource.

2. Brief Description of the Prior Art

Plastic is not any one material. Rather it is a family of related materials with varying properties that can be engineered to meet the requirements of a broad range of applications. The success of a product often is dependent on matching the right plastic with the right properties to the right application.

The same is true when the material in question is a recycled plastic. As a result, there is a premium placed on the purity of post-use plastics. The more uniform the post-use plastics going in, the more predictable the properties of the recycled plastic coming out.

Coding the plastic allows sorting before recycling, ensuring that the recycled plastic is as homogeneous as possible. Plastic containers for consumer use come in a variety of different colors based on marketing considerations. The same plastic may be used in different colored containers and the same color containers may be formed of chemically different plastics. Hence it not possible to sort post-consumer-use containers into homogeneous groupings of plastic based on color.

The benefit of sorting the plastic has led a number of entities to develop coding systems which are not dependent on color, including the Society of the Plastics Industry (SPI), the Society of Automotive Engineers (SAE), the American Society for Testing and Materials (ASTM) and the International Standards Organization (ISO). Except where laws may require the use of a particular code, manufacturers have the option of selecting the coding system most appropriate for their product or of not using any coding system at all.

Post-use plastic, even homogenous recycled plastic, has low scrap value. Hence high labor costs make recycling uneconomic unless the segregation of the plastic into groups can be done quickly and inexpensively. Consumer plastic containers are typically marked with an SPI code and can be sorted manually. This method is slow, labor intensive, and expensive. Although separation machines exist, they are expensive and have a recovery rate of only 70–80%. The machines rely on sophisticated analytical equipment, precise manipulation and technical expertise.

In industry, plastic is used on goods to protect parts for shipping or manufacturing purposes. For example caps are placed on tubing to keep it from being accidentally contaminated and on wire looms to keep them from being damaged. Separators are used to keep parts from rattling, clips are used to hold parts together, etc. The goods are shipped from a parts supplier to an original equipment manufacturer or assembler, where the plastic guards are removed and the part used. From the standpoint of the end-point industrial user, the color of the plastic guard makes no difference.

Some of the plastic guards are marked with an SPI or some other code, others are not marked at all. Because of the low scrap value of plastic and the inconsistency or absence of marking, the end-point industrial user has no economic incentive to recycle the discarded articles. Hence most post-industrial-use plastic is burned or sent to a landfill, giving rise to a litany of serious, well-known environmental problems, including global warming and water pollution. In addition, disposal charges for the post-industrial-use plastic waste add to the original equipment manufacturer's or assembler's manufacturing costs. Such being the circumstances, there exists a great social demand favoring recycling of post-industrial-user plastic waste. It is to this need that the present invention is directed.

BRIEF SUMMARY OF THE INVENTION

In view of the above, it is an object of the present invention to provide a simple, accurate and inexpensive system applicable for use in all manufacturing facilities for separating post-industrial-use plastic into groupings based on a selected coding system. It is another object to provide a system for recovering post-industrial-user plastic in a manner that the cost of sorting is less than the cost of disposing of the waste by burning or landfill, such that the industrial user has an economic incentive to use the system (i.e., the system reduces manufacturing costs). It is also an object to provide a system for recycling post-industrial-use plastic that is readily adaptable to existing manufacturing facilities. Other objects and features of the invention will be in part apparent and in part pointed out hereinafter.

In accordance with the invention, a system for recycling post-industrial-use plastic waste, in major part, includes the following steps:

(1) coloring an object, which will become post-industrial-use plastic waste, a user-specified color, the color providing information necessary for recycling;

(2) storing information pertaining to the user-specified color and coding system;

(3) observing the color of the object when the object is considered as potentially recyclable waste; and (4) processing the object based upon the observed color and the stored information.

The invention summarized above comprises the recycling system hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which:

FIGS. 1A and 1B are a block diagram showing a system for recycling post-industrial-use plastic waste in accordance with the present invention; and, FIG. 2 is a block diagram showing a user-specified color system to identify particular resins, integral to the recycling system shown in FIGS. 1A and 1B.

DETAILED DESCRIPTION OF THE INVENTION

This invention can be applied to post-industrial-plastic waste from most, if not all, original equipment manufacturers and assemblers. An embodiment of the invention will be explained with reference to the drawings.

Figure 1A:
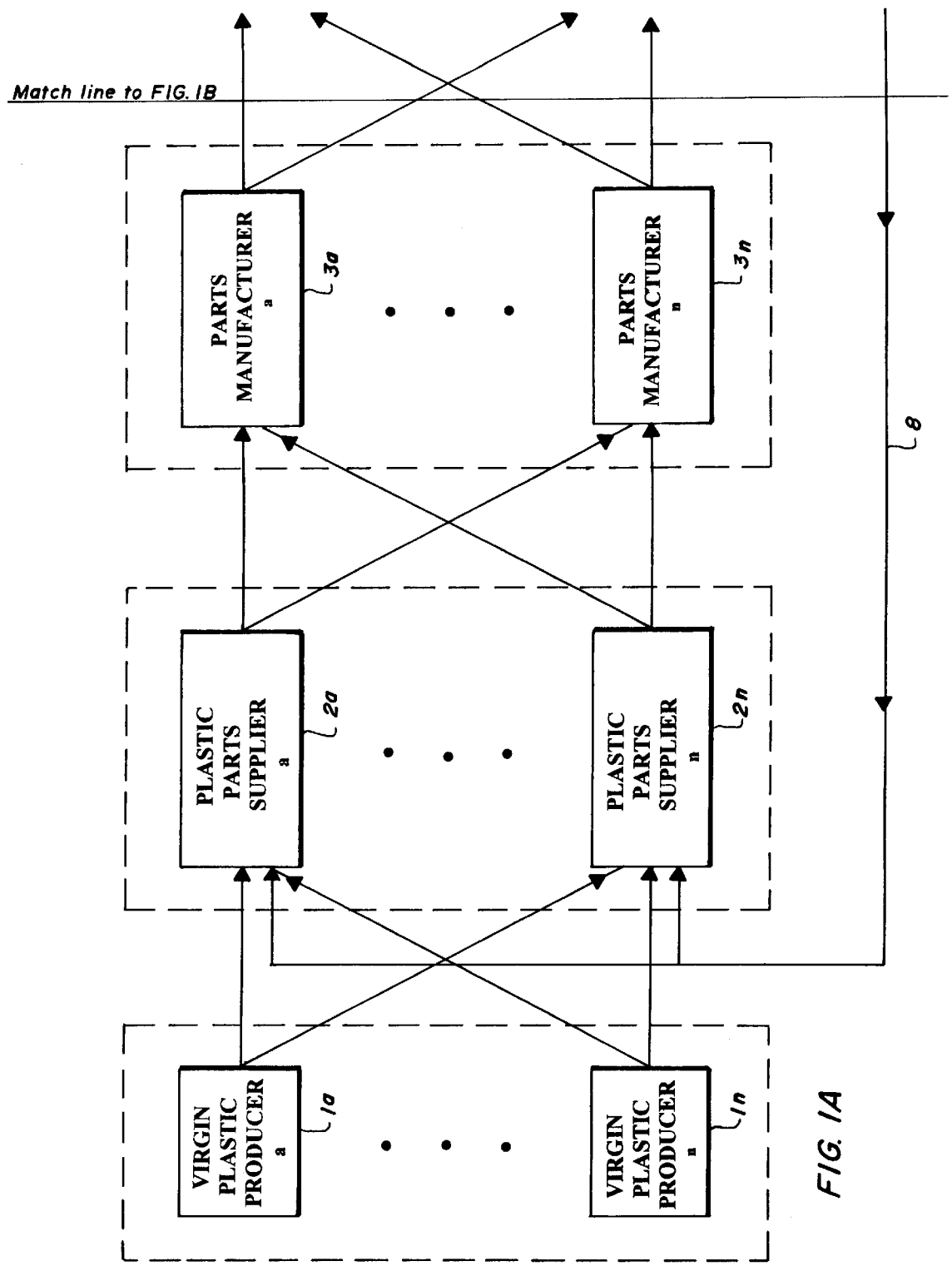
Figure 2:
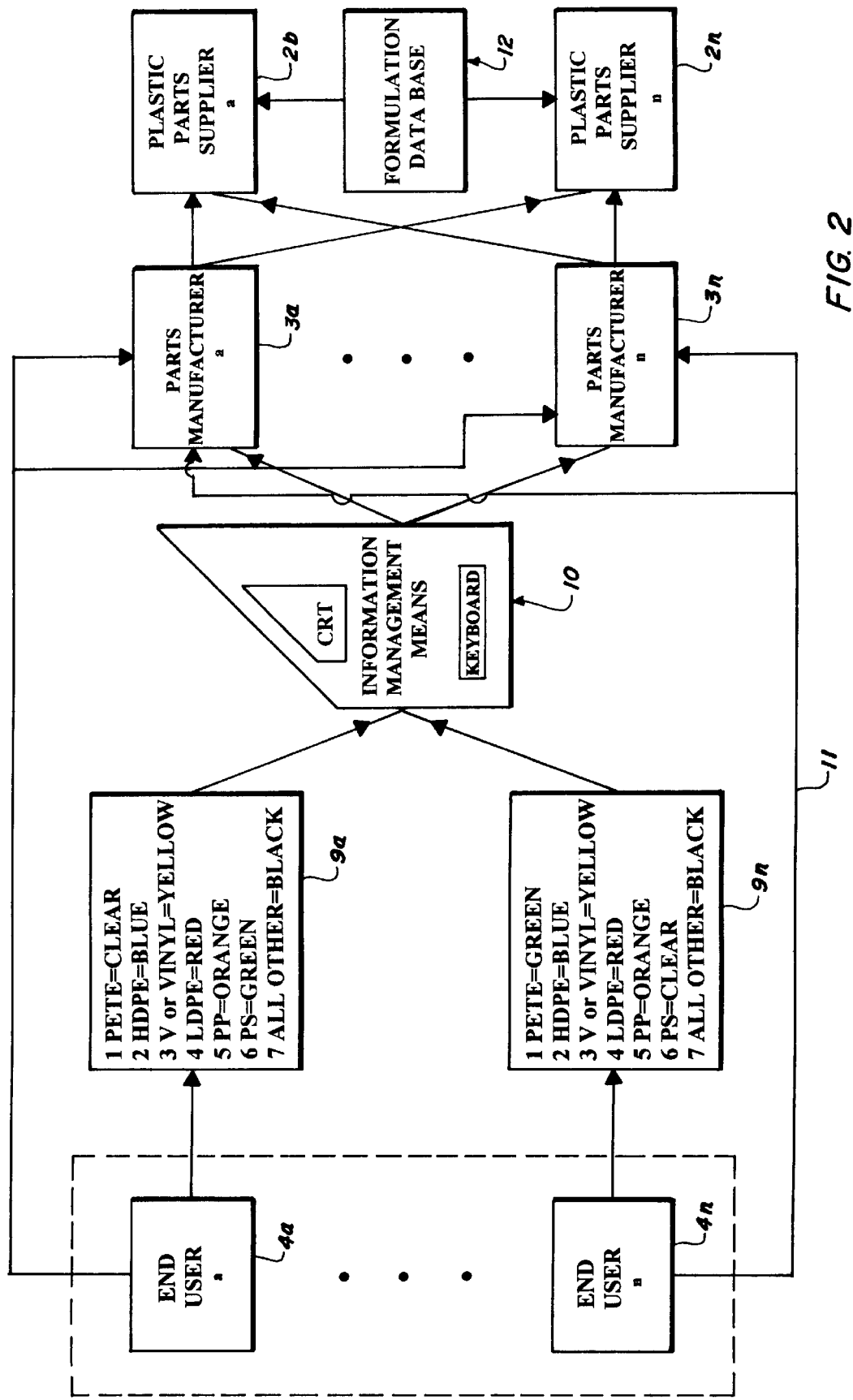

FIGS. 1A, 1B and 2 are block diagrams showing the overall arrangement of a system for recycling post-industrial-use plastic waste in accordance with the present invention. As shown in FIG. 1A, multiple virgin plastic producers 1a through 1n sell plastic material to plastic parts suppliers 2a through 2n. Plastic parts suppliers 2a through 2n produce molded plastic guards, which will become post-industrial-use plastic waste. The plastic guards are made to the specification of parts manufacturers 3a through 3n to keep parts clean or from rattling, to hold parts together, and so forth when the parts are shipped to the original equipment manufacturer or assembler, shown as end users 4a through 4n. Unlike consumers, end users 4a through 4n attach no value to the color of the plastic guards used by parts manufacturers 3a through 3n to protect parts for shipping or manufacturing purposes, i.e., it makes no difference to industrial end users 4a through 4n what color the plastic guards are.

Collection and sorting of the post-industrial-plastic waste into homogenous groups is accomplished by the end user in a simple, accurate and inexpensive manner. Employees of end users 4a through 4n color match the discarded guards with a similarly color marked receptacle 5. As shown in FIG. 1A, there may be one or more of seven different receptacles 5 positioned near the end-point user (original equipment manufacturer or assembler employee), depending on the number of different colored guards disposed of in his or her work area. Successful implementation of the system requires the cooperation of the end user's employees. This may be ensured by periodically reaffirming the beneficial impact recycling has on the environment, company, community, etc. or through employee profit sharing based on the resulting reduced manufacturing costs.

Most plastic guards for parts are made with one of six resins: polyethylene terephthalate (PETE); high density polyethylene (HDPE); polyvinyl chloride (PVC or vinyl); low density polyethylene (LDPE); polypropylene (PP); or polystyrene (PS). The SPI resin identification code assigns each of these resins a number from 1 to 6. The SPI coding system also includes a seventh code, identified as "other." Use of this code indicates that the product in question is made with a resin other than the six listed above, or is made of more than one resin used in combination. While the SPI coding system is illustrated in the drawings, it will be understood that the recycling system of the present invention is readily adaptable to the SAE code and so forth. It should also be noted that the color system used by end user 4a need not be the same as the color system used by end user 4n; however, it would be beneficial (i.e., more cost effective) if all users would adopt the system shown in the drawings for end user 4a.

Referring now to FIG. 1B, the post-industrial-use plastic waste sorted by end users 4a through 4n is picked up by one or more handlers 6. In prior art recycling schemes, sorting is also performed by the handlers, which as mentioned above is not economically feasible for post-industrial-use plastic waste. In the present system, handlers 6 bale or granulate the plastic which has already been separated into homogeneous plastic groups.

Handlers 6 truck the baled or granulated material to one or more reclaimers 7, where the plastic waste is cleaned (if not previously cleaned) and pelletized (if not previously pelletized) for sale to reclaimed product users 8a through 8n, who, in turn use the reclaimed resins as feedstock for manufacture of various plastic products. In some cases, one entity may fulfill the role of both plastics handler and plastics reclaimer. It will also be apparent that reclaimed product users 8a through 8n may be the same entities as plastic parts suppliers 2a through 2n (see return line 8 in FIGS. 1A and 1B).

In order for the above-described system to operate, there must be a user-specified color system to identify particular resins as shown in FIG. 2. End users 4a through 4n specify a color system 9a through 9n for sorting post-industrial-plastic waste into homogeneous resin groupings. For example, as shown, end user 4a may require PETE objects to be made of uncolored PETE, objects made of HDPE to be blue and so forth. End user 4n, on the other hand, may require PETE objects to be green but PS objects to be made of uncolored PS resin. Information concerning color systems 9a through 9n is stored on one more information management means 10 with input (e.g., keyboard) and output means (e.g., CRT). When end users 4a through 4n place an order (see line 11) with parts manufacturers 3a through 3n, information concerning relevant color systems 9a through 9n is provided to the parts manufacturers from information management means 10, as a requirement of the order is that any guards, which will become post-industrial-use plastic waste, be colored in accordance with the color system established by the end user (customer). This information is then transferred to plastic parts suppliers 2a through 2n. The plastic suppliers 2a through 2n draw upon one or more data bases 12 to formulate the plastic in the user-specified color. The plastic is employed by the plastic parts suppliers 2a through 2n to make guards used by parts manufacturers 3a through 3n to fulfill the end user's order. When the order is received by end users 4a through 4n, the guards become post-industrial-use plastic waste and are recycled as described above in connection with FIGS. 1A and 1B.

End users 4a through 4n have an economic incentive to implement the subject system for recycling post-industrial-use plastic. For example, the cost to landfill a ton of post-industrial-use plastic waste may be in the order of $40.00/ton, compared to a price of about $200.00/ton for the plastic, sorted into homogeneous groupings. The cost to the original equipment manufacturer or assembler is small as the amount of time an employee spends sorting the waste into receptacles 5 is minimal, as the waste must be placed in some receptacle anyway. Handlers 6, likely to be outside contractors, are available to empty receptacles 5 and haul the sorted post-use plastic away for recycling.

In view of the above, it will be seen that the several objects of the invention are achieved and other advantageous results attained. As various changes could be made in the above system without departing from the scope of the invention, it is intended that all matter contained in the above description or shown in the accompanying drawings shall be interpreted as illustrative and not in a limiting sense.

What is claimed:

1. A system for recycling post-industrial-use plastic waste including the steps of:

coloring an object, which will become post-industrial-use plastic waste, a user-specified color, said color providing information necessary for recycling;

storing information pertaining to said user-specified color and coding system;

observing said color of the object when the object is considered as potentially recyclable waste; and processing the object based upon said observed color and the stored information.

2. The system of claim 1 wherein the information necessary for recycling includes data correlating a distinct color with each plastic group in a coding system.

3. The system of claim 1 wherein the information necessary for recycling includes data correlating a distinct color with each plastic group in the Society of the Plastics Industry (SPI) coding system.

4. The system of claim 3 wherein the information necessary for recycling includes data correlating the following colors: clear, blue, yellow, red, orange, green and black with the SPI coding system.

5. The system of claim 4 wherein the information necessary for recycling includes data correlating clear with PETE, blue with HDPE, yellow with vinyl, red with LDPE, orange with PP, green with PS and black with other plastics.

6. A system for recycling post-industrial-use plastic waste including the steps of:

an end user defining a color system for identifying potentially recyclable plastic waste by color as a member of a plastic group of a coding system;

storing information pertaining to said user-specified color and coding system;

a plastic parts supplier coloring an object, which will become post-industrial-user plastic waste, a user-specified color, said color providing information necessary for recycling;

a parts manufacturer using the object as a guard to protect a part shipped to the end user;

the end user observing said color of the object when the guard is removed from the part and considered as potentially recyclable waste; and processing the object based upon said observed color and the stored information whereby the object can be sorted into a receptacle with other objects in the same plastic group.

7. The system of claim 6 further including the steps of:

a handler cleaning and baling or granulating the objects sorted into each plastic group;

a reclaimer cleaning the material treated by the handler, if not previously cleaned by the handler, and pelletizing the material into a reclaimed product suitable for use in the manufacture of plastic products.

8. The system of claim 7 wherein the plastic parts supplier references a data base to formulate the plastic in the user-specified color.

9. The system of claim 8 wherein the information necessary for recycling includes data correlating a distinct color with each plastic group in a coding system.

10. The system of claim 8 wherein the information necessary for recycling includes data correlating a distinct color with each plastic group in the Society of the Plastics Industry (SPI) coding system.

11. The system of claim 10 wherein the information necessary for recycling includes data correlating the following colors: clear, blue, yellow, red, orange, green and black with the SPI coding system.

12. The system of claim 11 wherein the information necessary for recycling includes data correlating clear with PETE, blue with HDPE, yellow with vinyl, red with LDPE, orange with PP, green with PS and black with other plastics.

* * * * *